United States Patent [19]

Braxton

[11] Patent Number: 4,493,118
[45] Date of Patent: Jan. 15, 1985

[54] COLLAPSIBLE TOILET SHELTER

[76] Inventor: Earl J. Braxton, 50575 Ryan Rd., Utica, Mich. 48087

[21] Appl. No.: 469,327

[22] Filed: Feb. 24, 1983

Related U.S. Application Data

[63] Continuation-in-part of Ser. No. 247,699, Mar. 26, 1981.

[51] Int. Cl.³ .................... A47K 11/02; E04H 1/02
[52] U.S. Cl. .......................................... 4/460; 4/449; 4/459
[58] Field of Search ................... 4/460, 614, 613, 612, 4/449, 459, 611, 527; 16/225, 372, DIG. 13

[56] References Cited

U.S. PATENT DOCUMENTS

| 1,582,766 | 4/1926 | Long | 4/527 |
| 1,990,871 | 2/1935 | Klocke | 16/225 X |
| 3,074,076 | 1/1963 | Kerstein | 4/459 |
| 3,835,480 | 9/1974 | Harding | 4/449 |
| 3,940,806 | 3/1976 | Mustee | 4/614 |
| 4,131,971 | 1/1979 | Saarlgos | 16/225 |
| 4,140,141 | 2/1979 | Marks | 16/DIG. 13 |
| 4,152,789 | 5/1979 | Heath | 4/611 |
| 4,163,294 | 8/1979 | Patterson | 4/449 |
| 4,285,077 | 8/1981 | Braxton | 4/449 X |
| 4,305,164 | 12/1981 | Sargent et al. | 4/460 |

FOREIGN PATENT DOCUMENTS 0528453  10/1940  United Kingdom ............... 4/460

Primary Examiner—Henry K. Artis
Attorney, Agent, or Firm—Krass & Young

[57] ABSTRACT

A shelter adapted for use as a portable toilet having a plurality of upstanding planar wall panels connected along adjacent vertical sides by flexible sheet hinge members. The wall panels, foldably collapsible for ease of shipment, are combined with a removable roof, base member and commode to form a complete portable toilet shelter which may be quickly assembled on site. A number of flexible straps may be positioned underneath the base member and releasably secured to opposing wall members of the shelter in order to secure the base member to the wall unit and increase the stability of the shelter.

13 Claims, 7 Drawing Figures

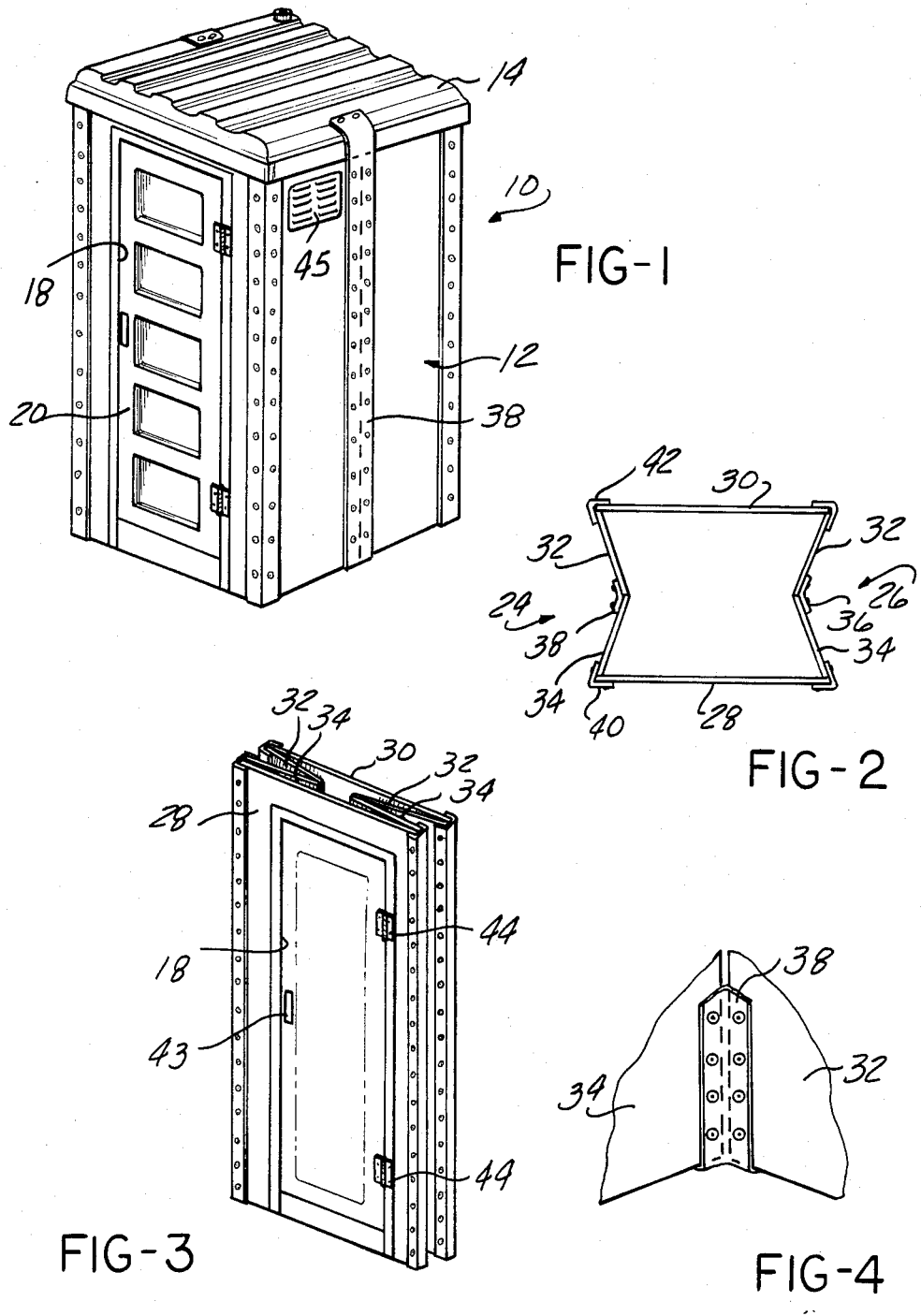

COLLAPSIBLE TOILET SHELTER

DESCRIPTION

CROSS REFERENCE TO RELATED APPLICATION

This application is a continuation-in-part of Ser. No. 247,699, filed Mar. 26, 1981.

TECHNICAL FIELD

This invention relates generally to building structures and more particularly to portable buildings. Still more specifically, the present invention relates to a collapsible portable toilet shelter.

BACKGROUND ART

Portable toilets, as commonly seen at job sites, are well known. Generally these structures are shipped to a job site fully assembled in one piece. Shipping this type of portable toilet is expensive because the structures are bulky and a full load usually weighs substantially less than the pay load capacity of a truck.

On large construction jobs or at special events, such as concerts or exhibitions, a large number of units may be required. In addition, due to the seasonal requirements of the construction industry, it is frequently necessary to transport large numbers of units from the northern climates in the summer to the southern climates during the winter months. A 60 foot tractor-trailor truck can accommodate up to 24 portable toilet units constructed according to the prior art.

The number of toilets required varies greatly from job to job, some jobs requiring as few as two units, and others requiring as many as ten. Small vehicles such as pick-up trucks are frequently used to transport units to job sites requiring only a small number of units. However, only three fully assembled units can be fit into the back of a pick-up truck. If more than a few units are required several truckloads or the use of a large capacity truck will be required. The large empty spaces within the shelters are not utilized during shipment and as a result high transportation costs are incured by portable toilet contractors.

Portable toilet shelters are usually one piece structures formed from fiberglass, polyethylene, metal or wood. At construction sites and exhibitions, portable toilet shelters are often damaged through accidents and vandalism. If the shell of the shelter is damaged it must be repaired if possible or the whole unit must be discarded even though parts of the unit are still functional. This results in excessive replacement and repair costs being incurred by portable toilet contractors.

The present invention is directed to overcoming all of the problems set forth above.

DISCLOSURE OF THE INVENTION

A collapsible portable toilet shelter constructed according to the present invention can be shipped in a collapsed state and assembled at a destination. The shelter is erected by unfolding the interconnected walls, fitting a base member including the floor and toilet unit inside the walls and positioning the roof on top of the walls. Once the basic structural elements of the portable toilet shelter are assembled and fastened together, various additional components can be assembled to provide a completely equipped portable toilet shelter.

The portable toilet shelter of the present invention can be efficiently transported because the space requirements are substantially reduced. In the collapsed condition the portable toilet shelter can be readily handled, and stacked on a transportation vehicle. As many as 100 portable toilet shelters can be shipped on a standard 60 foot tractor-trailer rig, four times the number of fully assembled units that can be shipped on the same truck. The unit of the present invention is simply constructed and can be assembled by a single person at a job site in a short period of time.

The shelter of the present invention is modular in construction resulting in easier repair and lower replacement cost. If an element of the unit is damaged it can be replaced quickly and easily without having to discard the entire unit. Expensive repairs of the fiberglass shell of former portable toilets are virtually eliminated since a damaged wall panel is simply replaced.

The portable toilet shelter can be broken down into discrete components and efficiently stacked for storage or transportation. According to the present invention the units can be broken down into base members including the commode floor member, folded wall sections and roof members. It should be noted that the units can be used in conjunction with traditional portable toilet shelters by stacking the components between and within hollow areas of the non-collapsible portable toilet shelters to maximize the number of unit that will fit on a given transportation vehicle.

Each of the walls of the unit are vertically hinged so that the side panels can swing inwardly to allow the front and back panels to collapse toward each other. In the preferred embodiment, the hinges are made of a resilient woven fabric strip which is secured along the length of each of the adjoining panel edges by conventional fasteners. However, it should be noted that the hinges might be composed of other sheet materials which are durable and flexible, such as polypropelene plastic. The continuous fabric hinge seals the unit, providing occupants with protection from the elements. In addition, the fabric is impervious to the destructive effects of adverse weather conditions. Thus, the hinge remains flexible for the life of the unit.

The base member includes a rigid polygonal frame dimensioned to fit within the bottom of the wall sections. Flexible straps may be positioned underneath the base member and secured to opposing walls of the unit with snap fasteners. The flexible straps, preferably made of a resilient woven fabric, secure the walls of the unit to the base member, thereby making it more difficult to tip the unit over onto its side.

The enclosure is completed by covering the top edges of the walls with a roof member. The roof member is secured to the walls by fabric hinge straps which are secured at one end to the side walls and extend over the outer edge of the roof member where the opposite end may be releasably secured to the roof member. A door is cut in one of the wall sections to provide access to the interior of the unit and other elements such as an urinal, a toilet paper dispenser and a vent stack are provided to complete the unit.

BRIEF DESCRIPTION OF THE DRAWINGS

FIG. 1 is a perspective view of the collapsible toilet shelter according to the present invention, as shown set up for use.

FIG. 2 is a horizontal cross sectional view showing the side walls being folded inwardly to collapse the shelter.

FIG. 3 is a perspective view showing the shelter in fully folded condition.

FIG. 4 is a fragmentary elevational view showing the continuous hinge interconnecting two wall panels.

BEST MODE FOR CARRYING OUT THE INVENTION

Figure 6:
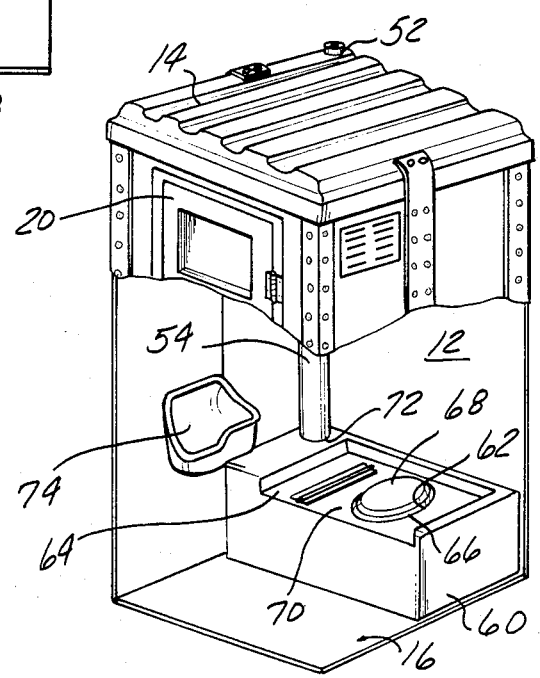
FIG. 6 is a cut-away perspective view of the collapsible portable toilet showing the interior of the unit set up for use.

The collapsible toilet shelter of the present invention, as shown in FIG. 1, generally indicated by reference numeral 10 is provided with upstanding inter-connected wall panels 12 to form an enclosure. The shelter 10 has a removable roof panel 14 disposed on the top edges of the wall panels 12. A door opening 18 is formed in one of the wall panels 12 and is adapted to be closed by a door 20. As shown in FIG. 6, the walls 12 are engaged by a base member, generally indicated at 16, for holding the bottom edge of the walls when the shelter is assembled. A commode member 60 is disposed on the base member 16 within the enclosure adjacent the wall 12 opposite the door 20.

Referring now to FIGS. 2, 3, and 4, the wall panels 12 are shown to include first and second two piece sidewalls 24 and 26, a front wall 28 and a rear wall 30. First and second two piece sidewalls 24 and 26 each include a rearward panel 32 and a forward panel 34 interconnected on adjacent vertical edges 36 by a continuous fabric hinge 38. The front wall 28 is rectangular in shape and connected to the forward panel 34 along its other vertical edge by a continuous fabric hinge 40. Similarly, the rear wall 30 is rectangular in shape and connected to the rearward panel 32 by continuous fabric hinge 42 along one vertical side edge. The forward and rearward side wall panels 32 and 34 fold inwardly to allow the front wall 28 and rear wall 30 to collapse toward each other, thus forming a substantially flat unitary member when folded. It should be noted that the fabric hinges 38, 40 and 42 could be woven from a variety of flexible sheet materials without departing from the spirit of the invention. The wall panels 12 are made of polyethylene and are preferably riveted to the hinges 38, 40 and 42. The front wall 28 has a door opening 18 disposed therein and a door 20 connected adjacent to the opening 18 by hinges 44. Front wall 28 in the preferred embodiment is substantially thicker than the sidewalls 24 and 26 to provide adequate support for the door 20 without requiring additional frame elements. The door 20 is equipped with a door handle 43 and may include a spring closure member (not shown). To provide fresh air to the enclosure a vent 45 may be located in one of the wall panels 12.

Figure 7:
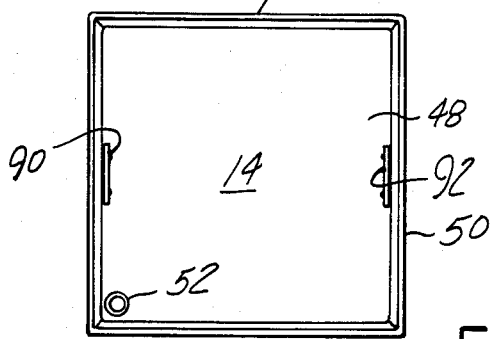
FIG. 7 is a bottom view of the roof member.

The roof panel 14 is a substantially square planar member formed of polyethylene. It is equipped with a pair of spacer brackets 90 and 92 on its lower surface 48 as shown in FIG. 7. The spacer brackets 90 and 92 are spaced inwardly from the edges 50 of the roof panel 14. The brackets 90 and 92 are adapted to be received within the top edges of the wall panels 12. In the preferred embodiment, the roof panel 14 extends outwardly from the wall panels 12 so that precipitation will run off on the exterior of the wall panels 12. An opening 52 is formed in one corner of the roof panel 14 to receive a vent stack 54 as will be more fully discussed subsequently.

Figure 5:
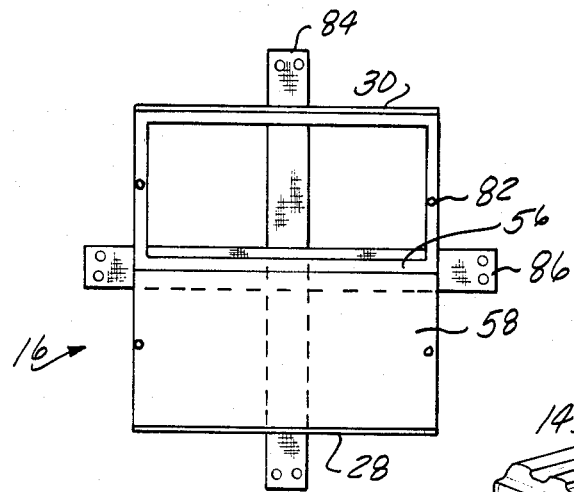
FIG. 5 is a plan view of a floor and tank support frame.

A base member 16, as shown in FIG. 5, is constructed preferably of wood and is sized to be received within the bottom edges of the wall panels 12. A cross brace 56 runs parallel to the front and rear walls 28 and 30 to provide rigidity. A floor 58 is securely fastened to the top of the frame between the cross brace 56 and front wall 28. A commode member 60 is disposed on the frame 56 between the cross brace 56 and rearwall 30. The commode member 22 comprises a tank 60 made of rotocast polyethylene. The tank 60 has a seat opening 62 in its top surface 64 over which a toilet seat 66 and cover 68 may be located. In the preferred embodiment a cleaning hatch 70 is provided in the top surface 64 of the tank 60, said hatch 70 having the seat opening 62 and toilet seat 66 located thereon. The cleaning hatch 70 is hinged so that it may be opened to facilitate cleaning. A vent opening 72 is formed in the top surface 64 of the tank 60 and is adapted to receive the vent stack 54. The vent stack 54 is made of polyvinylchloride and extends from the vent opening 72 in the tank 60 through the opening 52 for the vent stack 54 formed in the roof panel 14.

The entire unit may be simply assembled by unfolding the wall panels 12 to form a square enclosure be separating the front and rear walls 28 and 30, and extending the sidewalls 24 and 26 until parallel to each other. The base member 16 is then placed within the bottom portion of the wall panels 12 to retain them in a fixed position. A pair of fabric straps 84 and 86 may be placed underneath the base member 16 in criss-cross fashion, as shown in FIG. 5, and releasably secured to the opposing walls of the unit with a "christmas tree" fastener. The roof 14 is then placed on the top edge of the walls 12 so that each of the spacer brackets are positioned within the top edge of the walls 12. The roof panel 14 may be releasably secured to the side panels 12 by extending the ends of the fabric hinges 36 and 38 over the top of the roof panel and securing them with standard "christmas tree" fasteners, as shown in FIG. 1.

Next, the commode unit 22 is set on the base member 16 and the vent stack 54 is placed in position on the commode unit 22 to extend through the roof panel 14. As shown in FIG. 6, a urinal 74 may be attached to the first sidewall 24 in fluid flow relation to an opening 76 in the tank 60. A toilet paper dispenser (not shown) may also be provided on one of the sidewalls 24 or 26 to complete the assembly of the portable toilet shelter.

When it is time to move the portable toilet shelter to another location it may be collapsed by reversing the assembly steps outlined above and stacked on a transportation vehicle (not shown). The folded wall sections 12, roof panels 14, base members 16, and commode units 22 can be stacked in any convenient manner to maximize the number of units transportable by given vehicle. Collapsible units may also be used to supplement shipments of traditional toilet shelters. This may be done by folding the walls 12 of the unit and placing it between the old style portable toilet and then placing the base member 16 and roof panels 14 within the empty spaces of the old style portable toilet shelters. The entire assembly or disassembly operation can be accomplished within ten minutes or the entire unit can be shipped in its assembled condition if only a few units are required at a particular location.

Thus it is apparent that there has been provided, in accordance with the invention, a collapsible toilet shelter that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A collapsible toilet shelter comprising:
   (A) a plurality of rigid, upstanding, rectangular, planar wall panels arranged vertical edge to vertical edge to form a closed loop;
   (B) a continuous, flexible hinge strip permanently secured to the adjacent vertical side surfaces of each pair of adjacent panels and each extending the full height of the panels to visually and physically close the vertical gap between the panels, said hinge strips forming with said panels a continuous, vertical, articulated wall assembly permanently closed upon itself and foldably movable between
      (1) an expanded condition in which it forms a closed rectangular toilet enclosure having a front wall, a back wall, and two side walls, and
      (2) a collapsed condition in which it is folded flat upon itself for ease of shipment and storage;
   (C) a door opening in said front wall of said enclosure;
   (D) a door hingedly positioned in said door opening to provide access to said enclosure when opened and provide privacy for said enclosure when closed;
   (E) a rigid rectangular base member, including a commode, adapted to be removably positioned within the bottom marginal portions of said wall panels, with said commode juxtaposed to said back wall of said enclosure, and operative when so positioned to maintain said panels in their expanded, enclosure forming condition; and
   (F) a rigid rectangular roof member adapted to be removably positioned adjacent the top marginal portions of said panels and operative when so positioned to maintain said panels in their expanded, enclosure forming condition.

2. The improvement of claim 1 wherein each of said side walls includes a forward panel and a rearward panel, the forward panel being connected to the rearward panel by a flexible hinge strip enabling the forward and rearward panels to be maintained in an opened position co-planar to each other, or in a collapsed position parallel to each other and parallel to said front wall and said back wall.

3. A collapsible toilet structure according to claim 2 wherein:
   (G) the flexible hinge strips hingedly interconnecting the forward and rearward panels of said side walls include upper end portions extending upwardly above the tops of the panels; and
   (H) coacting fastener means are provided on said strap upper end portions and on opposite side edge portions of said roof member to allow said strap upper end portions to be removably secured to opposite side edge portions of said roof member and thereby assist in the removable securement of said roof member to said wall panels.

4. A collapsible toilet structure according to claim 3 wherein:

(G) each of said flexible hinge strips is permanently secured to the adjacent side surfaces of the adjacent panels by a plurality of vertically spaced fastener members passing through the hinge strip for securement to the panel.

5. The improvement of claim 2 wherein said flexible hinge strips are continuous fabric hinges extending vertically along the length of the walls.

6. The improvement of claim 2 wherein the base member is maintained in a fixed position relative to the wall panels by virtue of flexible straps, said flexible straps extending underneath the base member, each end of said flexible straps being releasably secured to opposing walls.

7. The improvement of claim 1 wherein a plurality of vents are formed in said side walls to permit circulation of fresh air into said enclosure.

8. A collapsible portable toilet shelter comprising:
   a plurality of upstanding planar wall panels connected along adjacent vertical sides by continuous flexible sheet hinge members such that said wall panels may be adjustably positioned to form a foldably collapsible polygonal enclosure:
   one of said wall panels having a door opening and a door adapted to be moveably disposed over said door opening;
   a removeable roof panel adapted to be mounted on top marginal portions of the wall panels;
   means disposed on the roof panel for retaining said top marginal portions of each wall panel in fixed relation to each other; and
   a removable base member maintained in a fixed position relative to the wall panels by virtue of flexible straps, said flexible straps extending underneath the base member, each end of said flexible straps being releasably secured to opposing walls, said base member adapted to retain bottom marginal portions of each wall panel in fixed relation to each other, said base member including:
      a polygonal frame member disposed on a horizontal plane
      a commode member mounted on said frame member in spaced relationship from the wall panel having said door opening, and
      a floor extending across the top portion of said frame member not covered by said commode member,
   whereby said shelter may be erected for use as a portable toilet shelter or disassembled to a collapsed state for shipment.

9. The collapsible portable toilet shelter of claim 3 wherein said commode member includes a one piece molded tank having a seat opening formed in a top surface of said tank.

10. The collapsible portable toilet shelter of claim 9 wherein said tank has a hinged hatch in the top surface, said hatch having said seat opening disposed therein.

11. The collapsible portable toilet shelter of claim 9 wherein said tank has a vent opening in the top surface spaced from said seat opening and a vent stack attached to said vent opening and extending through said roof panel.

12. The collapsible portable toilet shelter of claim 8 wherein a urinal is adapted to be attached to a side wall and is adapted to drain into said commode member.

13. A collapsible portable toilet shelter comprising:

(A) a plurality of rigid upstanding rectangular planar wall panels arranged vertical edge to vertical edge to form a closed loop;

(B) hinge means permanently and foldably interconnecting adjacent vertical edges of said wall panels and forming therewith a continuous articulated vertical wall assembly permanently closed upon itself and foldably movable between
  (1) an expanded condition in which it forms a closed rectangular toilet enclosure having a front wall, a back wall, and side walls and
  (2) a collapsed condition in which it is folded flat upon itself for ease of shipment and storage;

(C) a door opening formed in said front wall of said enclosure;

(D) a door hingedly positioned in said door opening to provide access to said enclosure when opened and provide privacy for said enclosure when closed;

(E) a rigid rectangular base member, including a commode, adapted to be removably positioned within the bottom marginal portions of said wall panels, with said commode juxtaposed to said back wall of said enclosure, and operative when so positioned to maintain said panels in their expanded enclosure forming condition; and (F) a rigid rectangular roof member adapted to be removably positioned adjacent the top marginal portion of said panels and operative when so positioned to maintain said panels in their expanded enclosure forming condition.

* * * * *